United States Patent
Yoon et al.

(10) Patent No.: US 7,765,815 B2
(45) Date of Patent: Aug. 3, 2010

(54) REFRIGERATOR AND METHOD FOR CONTROLLING THE SAME

(75) Inventors: Won-jae Yoon, Seoul (KR); Chul-woong Park, Sinan-gun (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 982 days.

(21) Appl. No.: 11/525,901

(22) Filed: Sep. 25, 2006

(65) Prior Publication Data
US 2007/0068180 A1    Mar. 29, 2007

(30) Foreign Application Priority Data
Sep. 28, 2005    (KR) .................. 10-2005-0090694

(51) Int. Cl.
*F25D 21/00* (2006.01)
*F25D 17/04* (2006.01)
*G05D 23/32* (2006.01)
*F25B 49/00* (2006.01)

(52) U.S. Cl. ............... 62/150; 62/158; 62/186; 62/199

(58) Field of Classification Search ............ 62/150, 62/157, 158, 180, 186, 199, 200
See application file for complete search history.

(56) References Cited

U.S. PATENT DOCUMENTS

| | | | | |
|---|---|---|---|---|
| 6,397,608 | B1 * | 6/2002 | Sakuma et al. ............... | 62/158 |
| 6,598,410 | B2 * | 7/2003 | Temmyo et al. ............. | 62/179 |
| 7,506,520 | B2 * | 3/2009 | Oh ............................. | 62/180 |
| 2005/0132733 | A1 * | 6/2005 | Rafalovich et al. ........... | 62/199 |
| 2007/0039339 | A1 * | 2/2007 | Lee ............................. | 62/183 |
| 2007/0113567 | A1 * | 5/2007 | Ahn et al. ..................... | 62/186 |

FOREIGN PATENT DOCUMENTS

| | | |
|---|---|---|
| JP | 04-136671 | 5/1992 |
| JP | 11-304328 | 11/1999 |
| KR | 10-0255947 | 2/2000 |
| KR | 2002-16503 | 3/2002 |
| KR | 10-2004-0064787 | 7/2004 |

OTHER PUBLICATIONS

Japanese Office Action for corresponding Japanese Patent Application No. 2006-263159 dated May 13, 2008 (2 pgs).

* cited by examiner

*Primary Examiner*—Marc E Norman
(74) *Attorney, Agent, or Firm*—Staas & Halsey LLP

(57) ABSTRACT

A refrigerator which includes a refrigerating compartment and a freezing compartment, a first evaporator and a second evaporator corresponding to the refrigerating compartment and the freezing compartment, respectively, a compressor compressing refrigerant to be supplied to the first and second evaporators, a first fan and a second fan supplying cool air to the compartments, respectively, an external temperature sensor detecting an external temperature of the refrigerator, a multi-directional valve supplying the refrigerant to at least one of the evaporators, and a control unit operating the compressor and the multi-directional valve, and driving the first fan and the second fan until temperatures of the compartments reach a predetermined reference temperature. When the detected external temperature meets a low temperature condition, the control unit controls the multi-directional valve to supply the refrigerant to the first evaporator such that the compressor is operated and an operation of the first fan is halted.

21 Claims, 5 Drawing Sheets

REFRIGERATOR AND METHOD FOR CONTROLLING THE SAME

CROSS-REFERENCE TO RELATED APPLICATIONS

This application claims the benefit of Korean Patent Application No. 10-2005-0090694, filed on Sep. 28, 2005, in the Korean Intellectual Property Office, the disclosure of which is incorporated herein by reference.

BACKGROUND OF THE INVENTION

1. Field of the Invention

The present invention relates to a refrigerator and a method for controlling the same. More particularly, a refrigerator having improved refrigerating cycle for preventing a dew condensation from occurring in a refrigerating compartment of the refrigerator, and a method for controlling the same.

2. Description of the Related Art

In general, a conventional refrigerator includes a main body having a refrigerating compartment and a freezing compartment for storing the goods such as foods, doors for opening and closing opening sections formed on the refrigerating compartment and the freezing compartment and a refrigerating cycle provided in the main body and supplying cool air to the refrigerating compartment and the freezing compartment for cooling the respective compartments.

In recent, in the refrigerating cycle, when two evaporators are provided for supplying independently cool air to the refrigerating compartment and the freezing compartment. For example, Korean Patent Laid Open publication No. 10-2004-0064787 discloses a refrigerator provided with the refrigerating cycle having two evaporators corresponding to the refrigerating compartment and the freezing compartment, respectively.

Further, Korean Patent Laid Open publication No. 10-1999-0034689 discloses a refrigerator which can prevent a dew condensation from occurring on the main body. This conventional refrigerator adopts the on/off cycle changing method for preventing the dew condensation from occurring on a front surface and side surfaces of the main body in a case that an external temperature is high in summer.

However, in this conventional refrigerator, when the external temperature meets the low temperature condition, the refrigeration operation for cooling the refrigerating compartment is relatively reduced so that moisture contained in cool air entered to an inside of the refrigerating compartment is not discharged to the evaporator, thereby forming dew on a wall surface of the refrigerating compartment.

SUMMARY OF THE INVENTION

Accordingly, it is an aspect of the present invention to provide a refrigerator which can prevent a dew condensation from occurring in a refrigerating compartment and a method for controlling the same.

Additional aspects and/or advantages of the invention will be set forth in part in the description which follows and, in part, will be apparent from the description, or may be learned by practice of the invention.

The foregoing and/or other aspects of the present invention can be achieved by providing a refrigerator including a main body having a refrigerating compartment and a freezing compartment, a first evaporator and a second evaporator provided corresponding to the refrigerating compartment and the freezing compartment, respectively, a compressor to compress refrigerant to be supplied to the first and second evaporators, a first fan and a second fan to supply cool air to the refrigerating compartment and the freezing compartment, respectively, an external temperature sensor to detect an external temperature, a multi-directional valve to supply the refrigerant to at least one of the first evaporator for the refrigerating compartment and the second evaporator for the freezing compartment, and a control unit operating the compressor and the multi-directional valve, and driving the first fan and the second fan until temperatures of the refrigerating compartment and the freezing compartment reached a predetermined reference temperature, wherein, when the detected external temperature meets a low temperature condition, the control unit controls the multi-directional valve to supply refrigerant to the first evaporator for the refrigerating compartment such that the compressor is operated and an operation of the first fan for the refrigerating compartment is halted.

According to an aspect of the present invention, the refrigerator further includes a refrigerant supplying tube to supply the refrigerant from the compressor to the first evaporator for the refrigerating compartment and the second evaporator for the freezing compartment, a first branch refrigerant tube and a second branch refrigerant tube diverged from the refrigerant supplying tube and opened and closed by the multi-directional valve, the first branch refrigerant tube and the second branch refrigerant tube being connected to the first evaporator and the second evaporator, respectively, and a connecting refrigerant tube connecting an outlet of the first branch refrigerant tube to an inlet of the second branch refrigerant tube.

According to an aspect of the present invention, the control unit controls the multi-directional valve to open the first branch refrigerant tube and close the second branch refrigerant tube to supply the refrigerant to the first evaporator for the refrigerating compartment and the second evaporator for the freezing compartment, when the external temperature meets the low temperature condition and while the compressor is operated.

According to an aspect of the present invention, the control unit controls the multi-directional valve to open the first branch refrigerant tube and close the second branch refrigerant tube, to supply the refrigerant to the first evaporator for the refrigerating compartment and the second evaporator for the freezing compartment for a predetermined time, and to close the first branch refrigerant tube and open the second branch refrigerant tube, to supply the refrigerant to the second evaporator for the freezing compartment after a lapse of the predetermined time, when the external temperature meets the low temperature condition and while the compressor is operated.

According to an aspect of the present invention, the refrigerator further includes a condenser provided between the compressor and the multi-directional valve, a first capillary tube provided between the first evaporator for the refrigerating compartment and the multi-directional valve, a second capillary tube provided between the second evaporator for the freezing compartment and the multi-directional valve, and a subsidiary capillary tube provided on the connecting refrigerant tube.

According to an aspect of the present invention, the low temperature condition is approximately below 18°.

The foregoing and/or other aspects of the present invention can be achieved by providing a refrigerator including a main body having a refrigerating compartment and a freezing compartment, a first evaporator and a second evaporator provided corresponding to the refrigerating compartment and the freezing compartment, respectively, a compressor to compress refrigerant to be supplied to the first and second evaporators, a first fan and a second fan to supply cool air to the refrigerating compartment and the freezing compartment, respectively, an external temperature sensor to detect an external temperature, a refrigerant supplying tube to supply the refrigerant from the compressor to the first evaporator for the refrigerating compartment and the second evaporator for the freezing compartment, a first branch refrigerant tube and a second branch refrigerant tube diverged from the refrigerant supplying tube, the first branch refrigerant tube and the second branch refrigerant tube being connected to the first evaporator for the refrigerating compartment and the second evaporator for the freezing compartment, respectively, a connecting refrigerant tube to connect an outlet of the first branch refrigerant tube to an inlet of the second branch refrigerant tube so as to connect the first evaporator to the second evaporator in series, and a control unit to operate the compressor and the multi-directional valve, and to drive the first fan for the refrigerating compartment and the second fan for freezing compartment until temperatures of the refrigerating compartment and the freezing compartment reached a predetermined reference temperature, wherein, when the detected external temperature meets a low temperature condition, the control unit controls the multi-directional valve to supply the refrigerant to the first evaporator for the refrigerating compartment such that the compressor is operated and an operation of the first fan for the refrigerating compartment is halted.

According to an aspect of the present invention, the control unit controls the multi-directional valve to open the first branch refrigerant tube and close the second branch refrigerant tube, to supply the refrigerant to the first evaporator for the refrigerating compartment and the second evaporator for the freezing compartment when the external temperature meets the low temperature condition and while the compressor is operated.

According to an aspect of the present invention, the control unit controls the multi-directional valve to open the first branch refrigerant tube and close the second branch refrigerant tube, to supply the refrigerant to the first evaporator for the refrigerating compartment and the second evaporator for the freezing compartment for a predetermined time, and to close the first branch refrigerant tube and open the second branch refrigerant tube, to supply the refrigerant to the second evaporator for the freezing compartment after a lapse of the predetermined time, when the external temperature meets the low temperature condition and while the compressor is operated.

According to an aspect of the present invention, the refrigerator further includes a condenser provided between the compressor and the multi-directional valve, a first capillary tube provided between the first evaporator for the refrigerating compartment and the multi-directional valve, a second capillary tube provided between the second evaporator for the freezing compartment and the multi-directional valve, and a subsidiary capillary tube provided on the connecting refrigerant tube.

The foregoing and/or other aspects of the present invention can be achieved by providing a refrigerator including a main body having a refrigerating compartment and a freezing compartment, a first evaporator and a second evaporator provided corresponding to the refrigerating compartment and the freezing compartment, respectively, a compressor to compress refrigerant to be supplied to the first and second evaporators, a first fan and a second fan to supply cool air to the refrigerating compartment and the freezing compartment, respectively, an external temperature sensor to detect an external temperature, a refrigerant supplying tube to supply the refrigerant from the compressor to the first evaporator for the refrigerating compartment and the second evaporator for the freezing compartment, a first branch refrigerant tube and a second branch refrigerant tube diverged from the refrigerant supplying tube, the first branch refrigerant tube and the second branch refrigerant tube being connected to the first evaporator for the refrigerating compartment and the second evaporator for the freezing compartment, respectively, a connecting refrigerant tube to connect an outlet of the first branch refrigerant tube to an inlet of the second branch refrigerant tube so as to connect the first evaporator to the second evaporator in series, and a control unit to operate the compressor and the multi-directional valve, and to drive the first fan for the refrigerating compartment and the second fan for freezing compartment until temperatures of the refrigerating compartment and the freezing compartment are reached a predetermined reference temperature, wherein, when the detected external temperature meets a low temperature condition, the control unit controls the multi-directional valve to open the first branch refrigerant tube and close the second branch refrigerant tube, to supply the refrigerant to the first evaporator for the refrigerating compartment and the second evaporator for the freezing compartment such that the compressor is operated and an operation of the first fan for the refrigerating compartment is halted.

According to an aspect of the present invention, the refrigerator further includes a condenser provided between the compressor and the multi-directional valve, a first capillary tube provided between the first evaporator for the refrigerating compartment and the multi-directional valve, a second capillary tube provided between the second evaporator for the freezing compartment and the multi-directional valve, and a subsidiary capillary tube provided on the connecting refrigerant tube.

The foregoing and/or other aspects of the present invention can be achieved by providing a refrigerator including a main body having a refrigerating compartment and a freezing compartment, a first evaporator and a second evaporator provided corresponding to the refrigerating compartment and the freezing compartment, respectively, a compressor to compress refrigerant to be supplied to the first and second evaporators, a first fan and a second fan to supply cool air to the refrigerating compartment and the freezing compartment, respectively, an external temperature sensor to detect an external temperature, a refrigerant supplying tube to supply the refrigerant from the compressor to the first evaporator for the refrigerating compartment and the second evaporator for the freezing compartment, a first branch refrigerant tube and a second branch refrigerant tube diverged from the refrigerant supplying tube, the first branch refrigerant tube and the second branch refrigerant tube being connected to the first evaporator for the refrigerating compartment and the second evaporator for the freezing compartment, respectively, a connecting refrigerant tube to connect an outlet of the first branch refrigerant tube to an inlet of the second branch refrigerant tube so as to connect the first evaporator to the second evaporator in series, and a control unit to operate the compressor and the multi-directional valve, and to drive the first fan for the refrigerating compartment and the second fan for freezing compartment until temperatures of the refrigerating compartment and the freezing compartment reached a predetermined reference temperature, wherein when the detected external temperature meets a low temperature condition such that the compressor is operated and an operation of the first fan for the refrigerating compartment is halted, the control unit controls the multi-directional valve to open the first branch refrigerant tube and close the second branch refrigerant tube, to supply the refrigerant to the first evaporator for the refrigerating compartment and the second evaporator for the freezing compartment for a predetermined time, and to close the first branch refrigerant tube and open the second branch refrigerant tube, to supply the refrigerant to the second evaporator for the freezing compartment after a lapse of the predetermined time.

According to an aspect of the present invention, the refrigerator further includes a condenser provided between the compressor and the multi-directional valve, a first capillary tube provided between the first evaporator for the refrigerating compartment and the multi-directional valve, a second capillary tube provided between the second evaporator for the freezing compartment and the multi-directional valve, and a subsidiary capillary tube provided on the connecting refrigerant tube.

The foregoing and/or other aspects of the present invention can be achieved by providing a method for controlling a refrigerator including a main body having a refrigerating compartment and a freezing compartment, the method including operating the compressor to compress the refrigerant, controlling a multi-directional valve to supply the refrigerant compressed by the compressor to a first evaporator for the refrigerating compartment and a second evaporator for the freezing compartment, and operating a first fan for the refrigerating compartment and a second fan for the freezing compartment until a temperature of the refrigerating compartment and the freezing compartment reaches a predetermined reference temperature, detecting an external temperature of the refrigerator, and supplying the refrigerant to the first evaporator for the refrigerating compartment such that the compressor is operated and an operation of the first fan for the refrigerating compartment is halted, when the detected external temperature meets a low temperature condition.

According to an aspect of the present invention, wherein the method further includes providing a first branch refrigerant tube and a second branch refrigerant tube to supply refrigerant to the first evaporator and the second evaporator, respectively, connecting outlets of the first evaporator for the refrigerating compartment and the first branch refrigerant tube to an inlet of the second branch refrigerant tube so as to connect the first evaporator for the refrigerating compartment to the second evaporator for the freezing compartment in series, and controlling the multi-directional valve to open and close the first and second branch refrigerant tubes.

According to an aspect of the present invention, the method for controlling the refrigerator further includes controlling the multi-directional valve to open the first branch refrigerant tube and close the second branch refrigerant tube, and supplying the refrigerant to the first evaporator for the refrigerating compartment and the second evaporator for the freezing compartment when the external temperature meets the low temperature condition and while the compressor is operated.

According to an aspect of the present invention, the method for controlling the refrigerator further includes controlling the multi-directional valve to open the first branch refrigerant tube and close the second branch refrigerant tube, to supply the refrigerant to the first evaporator for the refrigerating compartment and the second evaporator for the freezing compartment for a predetermined time, and to close the first branch refrigerant tube and open the second branch refrigerant tube, to supply the refrigerant to the second evaporator for the freezing compartment after a lapse of the predetermined time, when the external temperature meets the low temperature condition and while the compressor is operated.

BRIEF DESCRIPTION OF THE DRAWINGS

These and/or other aspects and advantages of the invention will become apparent and more readily appreciated from the following description of the embodiments, taken in conjunction with the accompany drawings of which.

DETAILED DESCRIPTION OF THE PREFERRED EMBODIMENTS

Figure 1:
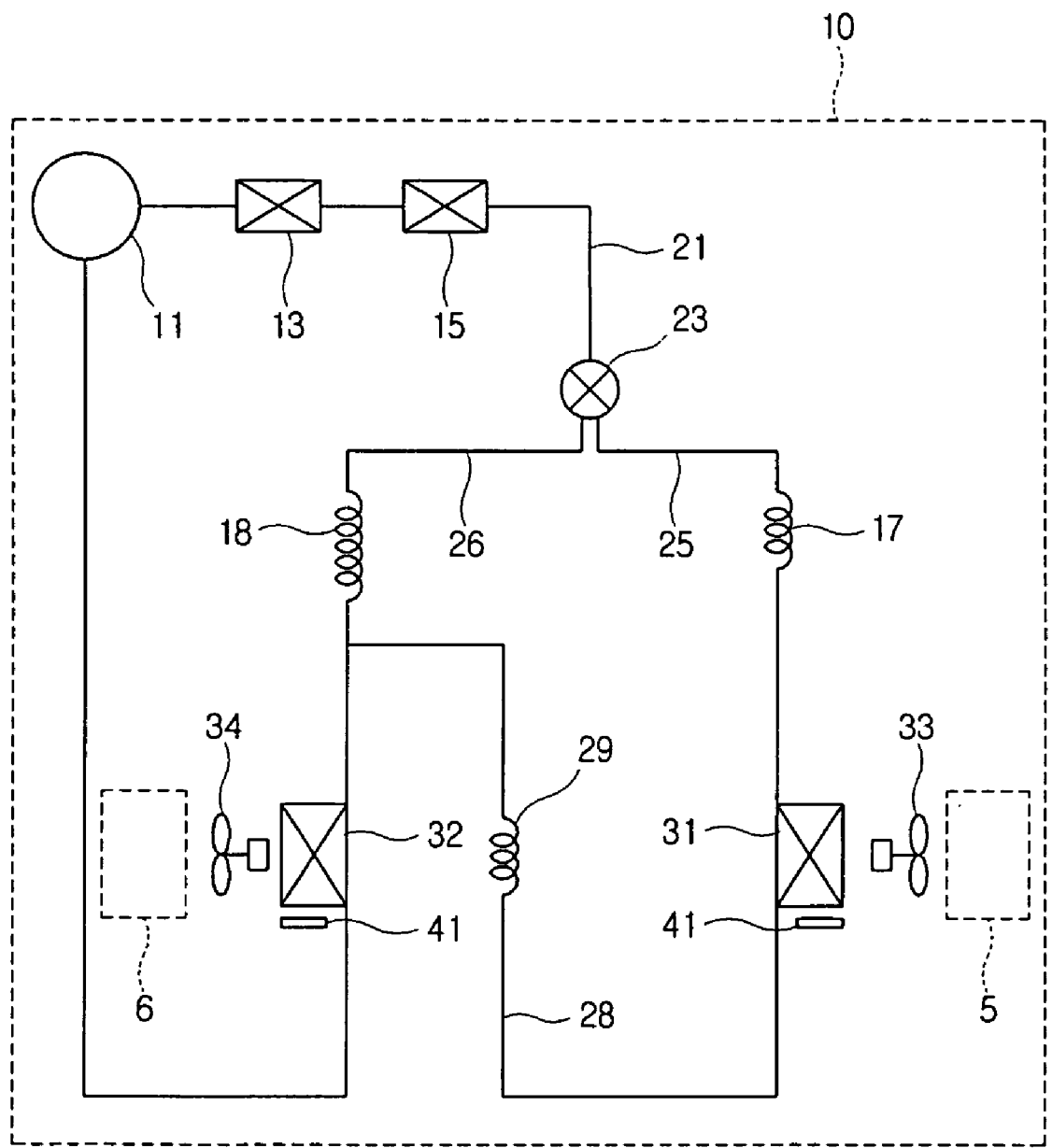
FIG. 1 is a structural view illustrating a refrigerating cycle of a refrigerator according to an embodiment of the present invention.
Figure 2:
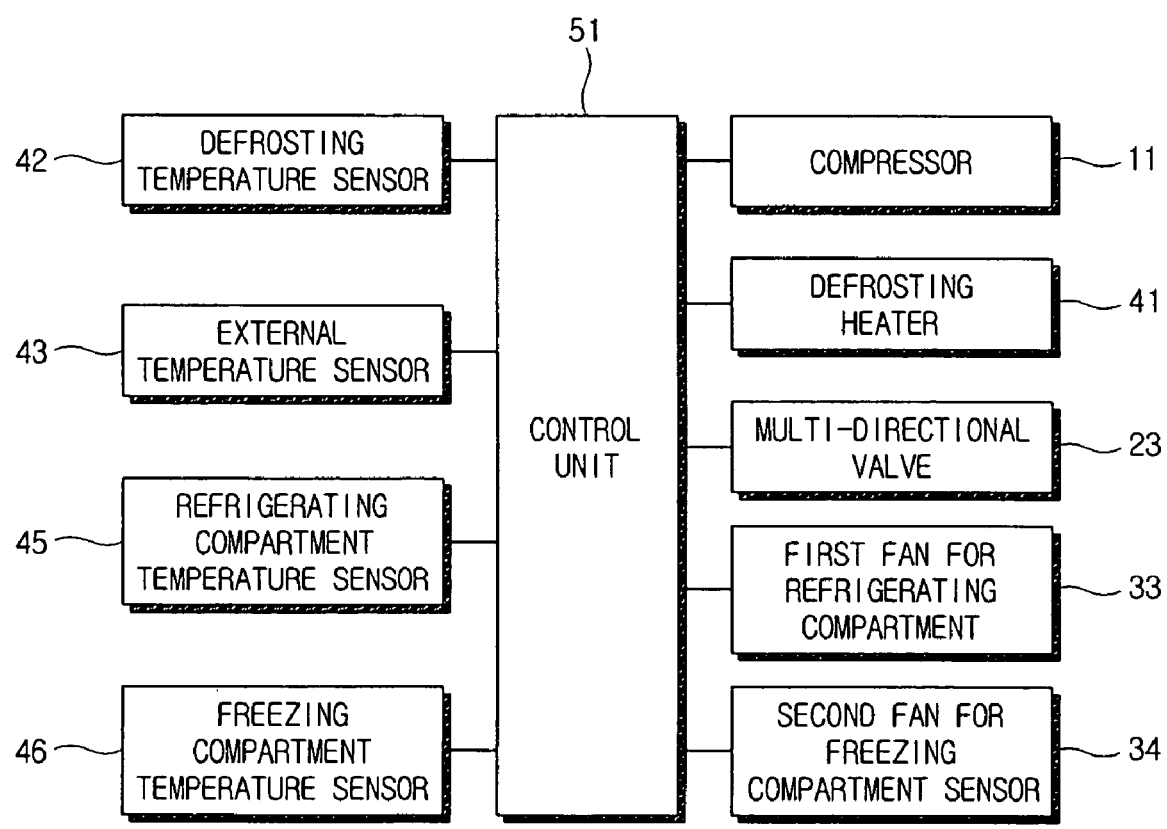
FIG. 2 is a control block diagram illustrating a refrigerator according to an embodiment of the present invention.

Reference will now be made in detail to the embodiments of the present invention, examples of which are illustrated in the accompanying drawings, wherein like reference numerals refer to like elements throughout. The embodiments are described below so as to explain the present invention by referring to the figures.

In FIGS. 1-4, a refrigerator according to the present invention comprises a main body (not shown) having a refrigerating compartment 5 and a freezing compartment 6; a pair of doors (not shown) for opening and closing the refrigerating compartment 5 and the freezing compartment 6, respectively, and refrigerating cycle 10 having a first evaporator 31 provided corresponding to the refrigerating compartment 5 and a second evaporator 32 provided corresponding to for the freezing compartment 6.

In this embodiment of the present invention, the refrigerator has the two-door type main body with the refrigerating compartment 5 and the freezing compartment 6 disposed at both sides thereof. However, the present invention is not limited hereto, and the arrangement of the refrigerating compartment 5 and the freezing compartment 6 may vary, as necessary.

The refrigerating cycle 10 comprises the first evaporator 31 for the refrigerating compartment and the second evaporator 32 for the freezing compartment, a first fan 33 and a second fan 34 to supply cool air generated in the first evaporator 31 and the second evaporator 32 to the refrigerating compartment 5 and the freezing compartment 6, respectively, a compressor 11 to compress refrigerant, an external temperature sensor 43 to detect an external temperature of the refrigerator, and a control unit 51 to operate the compressor 11 according to temperatures of the refrigerating department 5 and the freezing department 6, to supply the refrigerant to the first evaporator 31 and the second evaporator 32 and to drive the first fan 33 and the second fan 34 until temperatures of the refrigerating department 5 and the freezing department 6 are reached a predetermined reference temperature.

The refrigerating cycle 10 comprises a refrigerant supplying tube 21 to supply the compressed refrigerant to the first evaporator 31 and the second evaporator 32, a first branch refrigerant tube 25 and a second branch refrigerant tube 26 diverged from the refrigerant supplying tube 21 to be connected to the first evaporator 31 and the second evaporator 32, respectively, a connecting refrigerant tube 28 for connecting an outlet of the first branch refrigerant tube 25 to an inlet of the second branch refrigerant tube 26, and a multi-directional valve 23 provided among the refrigerant supplying tube 21, the first and second branch refrigerant tubes 25 and 26 so as to close and open the first and second branch refrigerant tubes 25 and 26.

The refrigerating cycle 10 comprises a condenser 13 for condensing the refrigerant compressed in the compressor 11 and supplying the condensed refrigerant to the refrigerant supplying tube 21, and first and second capillary tubes 17 and 18 mounted to the first and second branch refrigerant tubes 25 and 26 provided at outlet sides of the multi-directional valve 23, respectively. The refrigerating cycle 10 further comprises a hot pipe 15 connected between the condenser 13 and the refrigerant supplying tube 21 to prevent a dew condensation from occurring at a front region of the main body (not shown) where cool air within the refrigerator and hot air outside the refrigerator meet when the door is opened.

The refrigerating cycle 10 further comprises defrosting heaters 41 provided adjacent to the first evaporator 31 and the second evaporator 32, respectively, and defrosting temperature sensors 42 for detecting temperatures of the first evaporator 31 and the second evaporator 32, respectively. The refrigerating cycle 10 further comprise a refrigerating compartment temperature sensor 45 for detecting a temperature of the refrigerating compartment 5 and a freezing compartment temperature sensor 46 for detecting a temperature of the freezing compartment 6.

In an embodiment of the present invention, the external temperature sensor 43 is mounted to the main body (not shown) for measuring an external temperature outside the refrigerator. However, the present invention is not limited hereto and may vary, as necessary.

The refrigerant supplying tube 21 is provided between the condenser 13 and the multi-directional valve 23, and thus the refrigerant condensed in the condenser 13 is supplied to the multi-directional valve 23 through the refrigerant supplying tube 21. The multi-directional valve 23 can open or close each of the first and second branch refrigerant tubes 25 and 26 for supplying the refrigerant supplied from the refrigerant supplying tube 21 to at least one of the first and second branch refrigerant tubes 25 and 26. In an embodiment of the present invention, a three-way valve is provided as the multi-directional valve 23 for connecting the refrigerant supplying tube 21 to the first and second branch refrigerant tubes 25 and 26. However, the present invention is not limited hereto and may vary.

The first capillary tube 17 and the first evaporator 13 are mounted to the first branch refrigerant tube 25. The first capillary tube 17 is provided for converting a state of the refrigerant supplied from the multi-directional valve 23 into a state of a low pressure and a low temperature. The first evaporator 31 is provided such that the refrigerant passed through the first capillary tube 17 absorbs ambient heat and is then evaporated.

The second capillary tube 18 and the second evaporator 32 are mounted to the second branch refrigerant tube 26. The second capillary tube 18 is provided for converting a state of the refrigerant supplied from the multi-directional valve 23 into a state of a low temperature and a low pressure. The second evaporator 32 is provided such that the refrigerant passed through the second capillary tube 18 absorbs ambient heat and is then evaporated.

The connecting refrigerant tube 28 connects the outlet of the first branch refrigerant tube 25 to the inlet of the second branch refrigerant tube 26, to supply the refrigerant passed through the first branch refrigerant tube 25 to the second branch refrigerant tube 26. The connecting refrigerant tube 28 can be connected to the second branch refrigerant tube 26 between the second capillary tube 18 and the second evaporator 32. A subsidiary capillary tube 29 can be installed on the connecting refrigerant tube 28 for converting a state of the refrigerant passed through the first branch refrigerant tube 25 into a state of lower temperature and a low pressure.

The defrosting heater 41 removes frost formed on the first evaporator 31 and the second evaporator 32 in the state in which an operation of the compressor 11 is halted. On the basis of the signal regarding the temperature outputted from the defrosting temperature sensors 42, the control unit 51 determines whether to operate the defrosting heater 41. When an inside of the refrigerating compartment 5 is excessively cooled, the defrosting heater 41 can be operated by the control unit 51. Thus, the control unit 51 controls the first fan 33 for the refrigerating compartment for enabling air heated by the defrosting heater 41 to be supplied to the refrigerating compartment 5.

In an embodiment of the present invention, once a temperature of one or both of the refrigerating compartment 5 and the freezing compartment 6 is reached an upper limit of the preset refrigerating compartment temperature or an upper limit of the preset freezing compartment temperature, the control unit 51 drives the compressor 11, controls the multi-directional valve 23 to open the first branch refrigerant tube 25 and operates the first fan 33 for the refrigerating compartment and the second fan 34 for the freezing compartment. When a temperature of the refrigerating compartment 5 is reaches a lower limit of the preset refrigerating compartment temperature which is the reference temperature first, the control unit 51 halts an operation of the first fan 33 for the refrigerating compartment and operates continuously the second fan 34 for the freezing compartment. At this time, since an operation of the first fan 33 for the refrigerating compartment is halted, in order to enhance an efficiency of the second evaporator 32 for the freezing compartment, the control unit 51 controls the multi-directional valve 23 to open the second branch refrigerant tube 26 and close the first branch refrigerant tube 25. Once temperatures of the refrigerating compartment 5 and the freezing compartment 6 both reach a lower limit of the preset refrigerating compartment temperature and a lower limit of the preset freezing compartment temperature which are the reference temperatures, the control unit 51 halts operations of the compressor 11, the first fan 33 and the second fan 34.

The control unit 51 determines whether the refrigerating compartment 5 is excessively cooled in a state that an operation of the compressor 11 is halted and whether to operate the defrosting heater 41 on the basis of a signal regarding the temperature outputted from the defrosting temperature sensor 42. The control unit 51 receives the signal regarding the temperatures of the refrigerating compartment 5 and the freezing compartment 6 outputted from the refrigerating compartment temperature sensor 45 and the freezing compartment temperature sensor 46.

The control unit 51 compares an external temperature detected by the external temperature sensor 43 with a preset low temperature condition. When it is determined that the detected external temperature meets the low temperature condition such that the compressor 11 is operated and the second fan 34 for the freezing compartment is halted, the control unit 51 supplies the refrigerant to the first evaporator 31 so as to form a natural convection by which cool air generated in the first evaporator 31 and cool air in the refrigerating compartment 5 are mutually circulated. During the natural convection, the control unit 51 controls the multi-directional valve 23 to open the first branch refrigerant tube 25 and close the second branch refrigerant tube 26 which supplies the refrigerant to the first evaporator 31 and the second evaporator 32.

Figure 3:
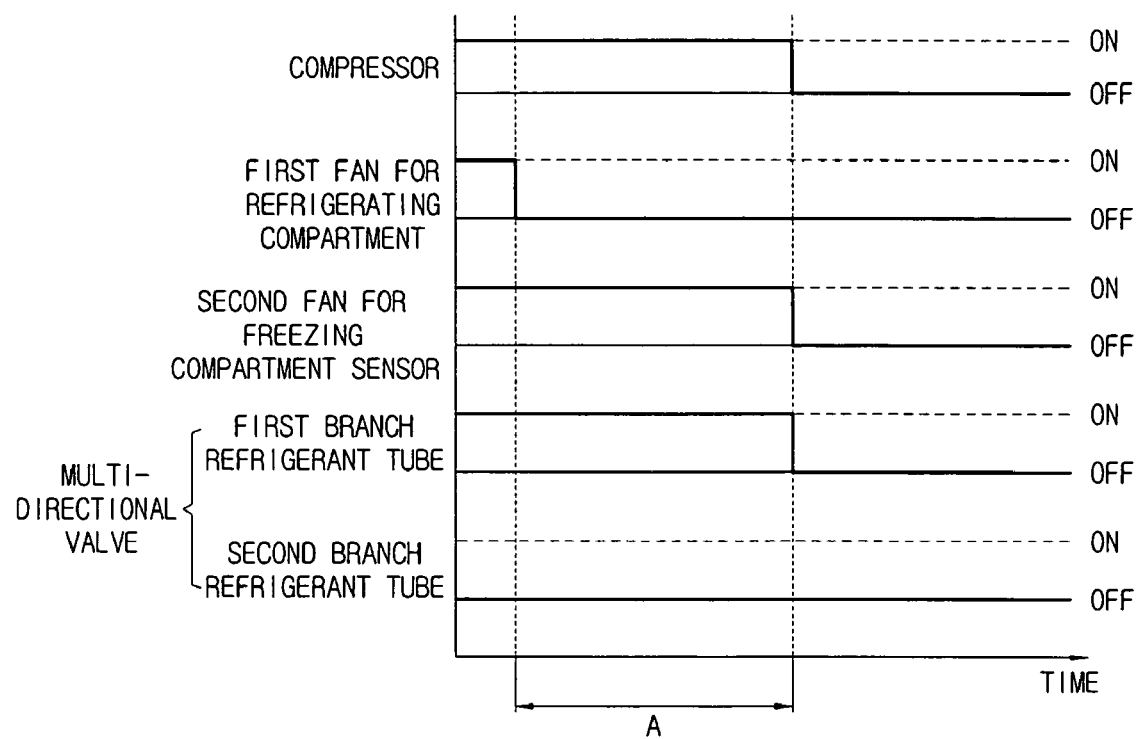
FIG. 3 and FIG. 4 are views illustrating a control state of a refrigerator according to an embodiment of the present invention.

As shown in FIG. 3, the control unit 51 opens the first branch refrigerant tube 25 for the time 'A' from a point of time on which an operation of the first fan 33 is halted to a point of time on which an operation of the second fan 34 is halted. Here, although the low temperature condition is approximately below 18° in an embodiment of the present invention, the present invention is not limited hereto. That is, the low temperature condition can be set variously at a temperature approximately below 20° or 12° and the like. When the external temperature meets the low temperature condition, since the temperature of the refrigerating compartment 5 does not rise considerably, an operation time of the first fan 33 for the refrigerating compartment becomes short relatively, and thus moisture contained in the cool air supplied to the refrigerating compartment 5 is not discharged to the first evaporator 31 and it can cause the dew condensation on a wall surface of the refrigerating compartment 5. Due to the above structure, the cool air generated in the first evaporator 31 for the refrigerating compartment is flown downward and entered to a lower region of the refrigerating compartment 5 and the cool air existed at an upper region of the refrigerating compartment 5 is entered to the first evaporator 31 for the refrigerating compartment, and thus the circulation is generated by the natural convection and it is possible to prevent a dew condensation from occurring on a wall surface of the refrigerating compartment 5.

To supply the refrigerant to the first evaporator 31 and the second evaporator 32 in a process of natural convection, the control unit 51 opens the first branch refrigerant tube 25 and closes the second branch refrigerant tube 26 for a predetermined time. After a lapse of the predetermined time, the control unit can control the multi-directional valve 23 such that the first branch refrigerant tube 25 is closed and the second branch refrigerant tube 26 is opened to supply the refrigerant to the second evaporator 32.

Figure 4:
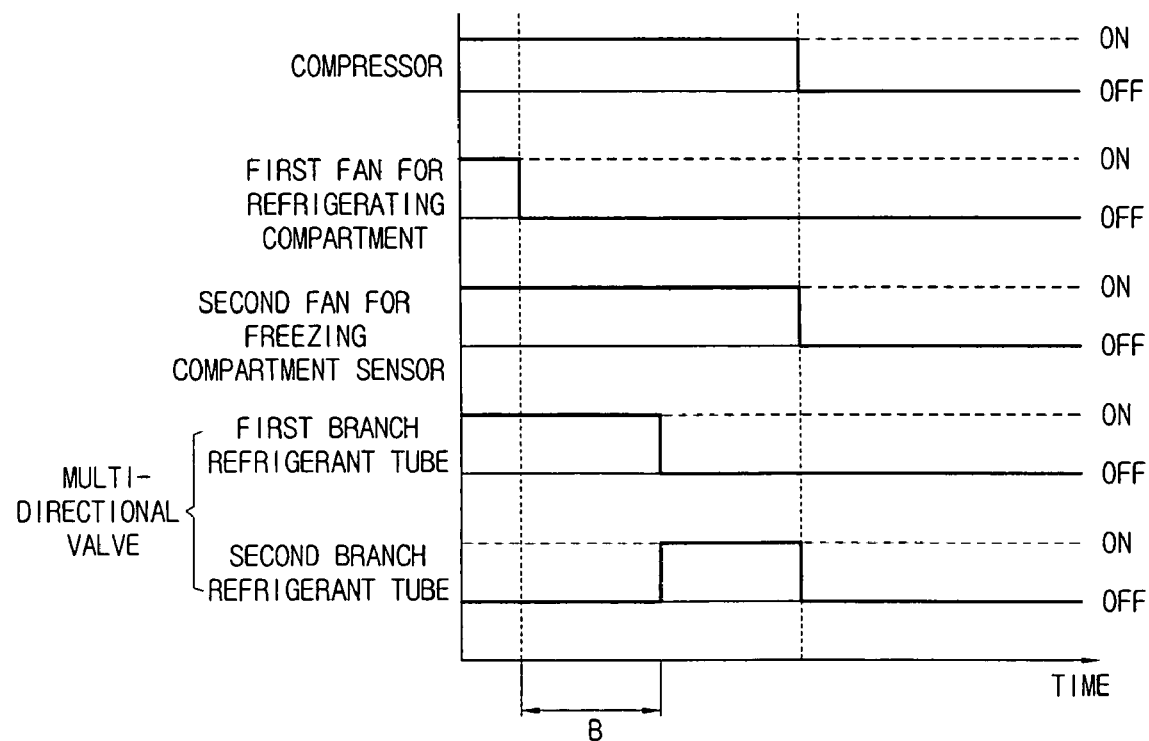

As shown in FIG. 4, the predetermined time 'B' for which the natural convection is generated can be less than the time from a point of time on which an operation of the first fan 33 is halted to a point of time on which an operation of the second fan 34 is halted, and time 'B' can be predetermined variously such as 10 minutes according to the external temperature and a temperature of the refrigerating compartment 5 and the like.

To supply the refrigerant to the first evaporator 31 and the second evaporator 32 in a process of natural convection, the control unit 51 controls the multi-directional valve 23 to open both the first and second branch refrigerant tubes 25 and 26. The control unit 51 also controls the time to supply the refrigerant to the first evaporator 31.

A flow path of the refrigerant in the refrigerating cycle of the refrigerator according to the present invention having the above structure is described as follow.

First, the refrigerant compressed in the compressor 11 is passed through the condenser 13 and the hot pipe 15 and then entered to the refrigerant supplying tube 21. The refrigerant entered to the refrigerant supplying tube 21 can be supplied to at least one of the first branch refrigerant tube 25 and the second branch refrigerant tube 26 through the multi-directional valve 23.

When the multi-directional valve 23 opens only the first branch refrigerant tube 25 according to a control operation of the control unit 51, the refrigerant passed through the multi-directional valve 23 is passed sequentially through the first capillary tube 17, the first evaporator 31 for the refrigerating compartment, the connecting refrigerant tube 28, the subsidiary capillary tube 29 and the second evaporator 32 for the freezing compartment, and then entered to the compressor 11. Thus, the refrigerant passed through the multi-directional valve 23 is passed successively through the first evaporator 31 and the second evaporator 32.

Also, when the multi-directional valve 23 opens only the second branch refrigerant tube 26 according to a control operation of the control unit 51, the refrigerant passed through the multi-directional valve 23 is passed sequentially through the second capillary tube 18 and the second evaporator 32 for the freezing compartment, and then entered to the compressor 11.

Further, when the multi-directional valve 23 opens all the first and second branch refrigerant tubes 25 and 26 according to a control operation of the control unit 51, the refrigerant passed through the multi-directional valve 23 is supplied to the first and second capillary tubes 17 and 18 to enter to the first evaporator 31 and the second evaporator 32. The refrigerant passed through the first evaporator 31 is supplied to the second evaporator 32 through the connecting refrigerant tube 28 and the subsidiary capillary tube 18, and then entered to the compressor 11.

Figure 5:
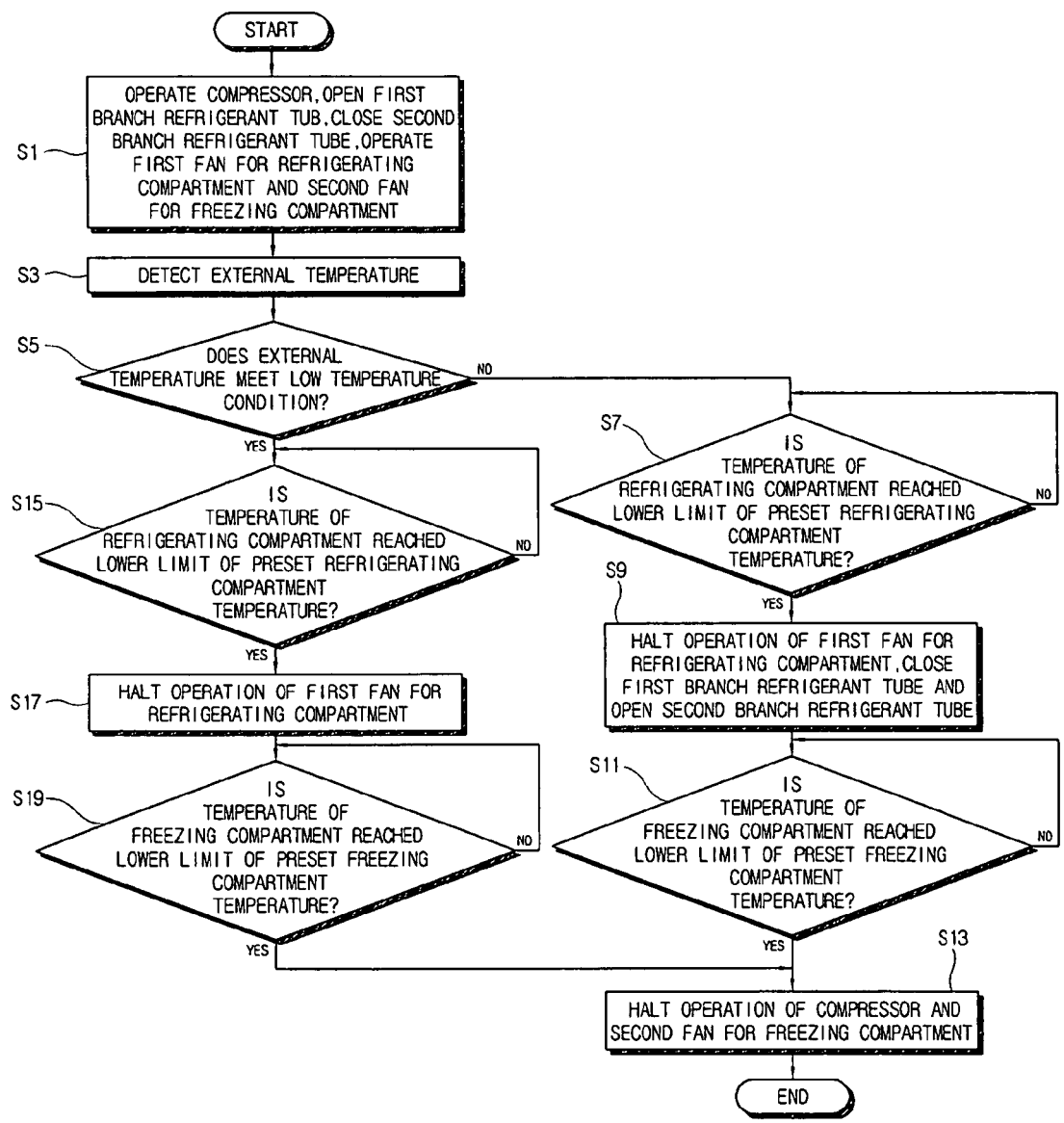
FIG. 5 is a flow chart illustrating a method of controlling a refrigerator according to an embodiment of the present invention.

FIG. 5 is a flowchart illustrating a method for controlling a refrigerating cycle of the refrigerator according to an embodiment of the present invention.

In FIG. 5, in operation 1, the compressor 11 is operated according to temperatures of the refrigerating compartment 5 and the freezing compartment 6, the refrigerant compressed by the compressor 11 is supplied to the first evaporator 31 and the second evaporator 32. Further, the first fan 33 and the second fan 34 are operated until the temperatures of the refrigerating compartment 5 and the freezing compartment 6 reached the predetermined reference temperature. In an embodiment of the present invention, the first branch refrigerant tube 25 is opened and the second refrigerant tube 26 is closed for supplying the refrigerant compressed by the compressor 11 to the first evaporator 31 and the second evaporator 32. Alternatively, both the first and second branch refrigerant tubes 25 and 26 may be opened in order to supply the refrigerant compressed by the compressor 11 to the first evaporator 31 and the second evaporator 32.

From operation 1 the process moves to operation 3, where an external temperature of the refrigerator is detected by the external temperature sensor 43. From operation 3, the process moves to operation 5, where the control unit determines whether the detected external temperature meets the low temperature condition. When it is determined the external temperature does not meet the low temperature condition in operation 5, the process moves to operation 7, where the control unit determines whether a temperature of the refrigerating compartment 5 reaches a lower limit of the preset refrigerating compartment temperature which is the reference temperature. Alternatively, when it is determined that the temperature of the refrigerating compartment 5 reaches a lower limit of the preset refrigerating compartment temperature in operation 7, the process moves to operation 9, where the control unit halts an operation of the first fan 33 for the refrigerating compartment, and closes the first branch refrigerant tube 25 and opens the second branch refrigerant tube 26 for increasing a cooling efficiency of the second evaporator 32 for the freezing compartment. From operation 9, the process moves to operation 11, where the control unit determines whether the temperature of the freezing compartment 6 reaches a lower limit of the preset freezing compartment temperature, which is the reference temperature. When it is determined that the temperature of the freezing compartment 6 reaches a lower limit of the preset freezing compartment temperature in operation 11, the process moves to operation 13 where the operations of the compressor 11 and the second fan 34 for the freezing compartment are halted.

Alternatively, when it is determined that the external temperature meets the low temperature condition in operation 5, the process moves to operation 15, where the control unit decides whether the temperature of the refrigerating compartment 5 reaches a lower limit of the preset refrigerating compartment temperature, which is the reference temperature. When it is determined that the temperature of the refrigerating compartment 5 reaches a lower limit of the preset refrigerating compartment temperature in operation 15, the process moves to operation 17 where the control unit halts an operation of the first fan 33 for the refrigerating compartment, and makes the first branch refrigerant tube 25 maintain its opened state and the second branch refrigerant tube 26 maintain its closed state for supplying continuously the refrigerant to the first evaporator 31 for the refrigerating compartment. Thus, cool air generated in the first evaporator 31 for the refrigerating compartment and cool air in the refrigerating compartment 5 are mutually circulated by natural convection, and thus it is possible to prevent a dew condensation from occurring in the refrigerating compartment 5.

From operation 17, the process moves to operation 19, where the control unit determines whether the temperature of the freezing compartment 6 reaches a lower limit of the preset freezing compartment temperature, which is the reference temperature. When it is determined that the temperature of the freezing compartment 6 reaches a lower limit of the preset freezing compartment temperature in operation 19, the process moves to operation 13, where the operations of the compressor 11 and the second fan 34 for the freezing compartment are halted.

As described above, in the refrigerator according to an embodiment of the present invention, when the detected external temperature meets the low temperature condition, the refrigerant is supplied to the first evaporator for the refrigerating compartment in the state that the compressor is operated and an operation of the second fan for the freezing compartment is halted, and thus cool air generated in the first evaporator for the refrigerating compartment and cool air in the refrigerating compartment are mutually circulated by natural convection, whereby it is possible to prevent a dew condensation from occurring in the refrigerating compartment.

As described above, according to the present invention, the refrigerator which can prevent a dew condensation from occurring in the refrigerating compartment and a method for controlling the same can be provided.

Although a few embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A refrigerator comprising
a main body comprising a refrigerating compartment and a freezing compartment;
a first evaporator and a second evaporator corresponding to the refrigerating compartment and the freezing compartment, respectively;
a compressor to compress refrigerant to be supplied to the first and second evaporators;
a first fan and a second fan to supply cool air to the refrigerating compartment and the freezing compartment, respectively;
an external temperature sensor to detect an external temperature of the refrigerator;
a multi-directional valve to supply the refrigerant to at least one of the first evaporator for the refrigerating compartment and the second evaporator for the freezing compartment; and
a control unit to operate the compressor and the multi-directional valve, and driving the first fan for the refrigerating compartment and the second fan for freezing compartment until temperatures of the refrigerating compartment and the freezing compartment reach a predetermined reference temperature,
wherein, when the detected external temperature meets a low temperature condition, the control unit controls the multi-directional valve to supply the refrigerant to the first evaporator for the refrigerating compartment in the state that the compressor is operated and an operation of the first fan for the refrigerating compartment is halted.

2. The refrigerator according to claim 1 further comprising:
a refrigerant supplying tube to supply the refrigerant from the compressor to the first evaporator for the refrigerating compartment and the second evaporator for the freezing compartment;
a first branch refrigerant tube and a second branch refrigerant tube diverged from the refrigerant supplying tube, and opened and closed by the multi-directional valve, the first branch refrigerant tube and the second branch refrigerant tube being connected to the first evaporator for the refrigerating compartment and the second evaporator for the freezing compartment, respectively; and
a connecting refrigerant tube to connect an outlet of the first branch refrigerant tube to an inlet of the second branch refrigerant tube.

3. The refrigerator according to claim 2, wherein the control unit controls the multi-directional valve to open the first branch refrigerant tube and close the second branch refrigerant tube, to supply the refrigerant to the first evaporator for the refrigerating compartment and the second evaporator for the freezing compartment when the external temperature meets the low temperature condition and while the compressor is operated.

4. The refrigerator according to claim 2, wherein the control unit controls the multi-directional valve to open the first branch refrigerant tube and close the second branch refrigerant tube, to supply the refrigerant to the first evaporator for the refrigerating compartment and the second evaporator for the freezing compartment for a predetermined time.

5. The refrigerator according to claim 4, wherein the control unit controls the multi-directional valve to close the first branch refrigerant tube and open the second branch refrigerant tube, to supply the refrigerant to the second evaporator for the freezing compartment after a lapse of the predetermined time, when the external temperature meets the low temperature condition and while the compressor is operated.

6. The refrigerator according to claim 2, further comprising:
a condenser provided between the compressor and the multi-directional valve;
a first capillary tube provided between the first evaporator for the refrigerating compartment and the multi-directional valve;
a second capillary tube provided between the second evaporator for the freezing compartment and the multi-directional valve; and
a subsidiary capillary tube provided on the connecting refrigerant tube.

7. The refrigerator according to claim 1, wherein the low temperature condition is set at approximately below 18°.

8. A refrigerator comprising:
a main body comprising a refrigerating compartment and a freezing compartment;
a first evaporator and a second evaporator provided corresponding to the refrigerating compartment and the freezing compartment, respectively;
a compressor to compress refrigerant to be supplied to the first and second evaporators;
a first fan and a second fan provided to supply cool air to the refrigerating compartment and the freezing compartment, respectively;
an external temperature sensor to detect an external temperature of the refrigerator;
a refrigerant supplying tube to supply the refrigerant from the compressor to the first evaporator for the refrigerating compartment and the second evaporator for the freezing compartment;
a first branch refrigerant tube and a second branch refrigerant tube diverged from the refrigerant supplying tube, the first branch refrigerant tube and the second branch refrigerant tube being connected to the first evaporator for the refrigerating compartment and the second evaporator for the freezing compartment, respectively;
a connecting refrigerant tube to connect an outlet of the first branch refrigerant tube to an inlet of the second branch refrigerant tube so as to connect the first evaporator to the second evaporator in series; and
a control unit to operate the compressor and the multi-directional valve, and to drive the first fan for the refrigerating compartment and the second fan for freezing compartment until temperatures of the refrigerating compartment and the freezing compartment reach a predetermined reference temperature,
wherein, when the detected external temperature meets a low temperature condition, the control unit controls the multi-directional valve to supply the refrigerant to the first evaporator for the refrigerating compartment such that the compressor is operated and an operation of the first fan for the refrigerating compartment is halted.

9. The refrigerator according to claim 8, wherein the control unit controls the multi-directional valve to open the first branch refrigerant tube and close the second branch refrigerant tube, to supply the refrigerant to the first evaporator for the refrigerating compartment and the second evaporator for the freezing compartment, when the external temperature meets the low temperature condition and while the compressor is operated.

10. The refrigerator according to claim 8, wherein the control unit controls the multi-directional valve to open the first branch refrigerant tube and close the second branch refrigerant tube, to supply the refrigerant to the first evaporator for the refrigerating compartment and the second evaporator for the freezing compartment for a predetermined time.

11. The refrigerator according to claim 10, wherein the control unit controls the multi-directional valve to close the first branch refrigerant tube and open the second branch refrigerant tube, to supply the refrigerant to the second evaporator for the freezing compartment after a lapse of the predetermined time, when the external temperature meets the low temperature condition and while the compressor is operated.

12. The refrigerator according to claim 8, further comprising:
a condenser provided between the compressor and the multi-directional valve;
a first capillary tube provided between the first evaporator for the refrigerating compartment and the multi-directional valve;
a second capillary tube provided between the second evaporator for the freezing compartment and the multi-directional valve; and a subsidiary capillary tube provided on the connecting refrigerant tube.

13. A refrigerator comprising:
a main body comprising a refrigerating compartment and a freezing compartment;
a first evaporator and a second evaporator provided corresponding to the refrigerating compartment and the freezing compartment, respectively;
a compressor to compress refrigerant to be supplied to the first and second evaporators;
a first fan and a second fan to supply cool air to the refrigerating compartment and the freezing compartment, respectively;
an external temperature sensor to detect an external temperature of the refrigerator;
a refrigerant supplying tube to supply the refrigerant from the compressor to the first evaporator for the refrigerating compartment and the second evaporator for the freezing compartment;
a first branch refrigerant tube and a second branch refrigerant tube diverged from the refrigerant supplying tube, the first branch refrigerant tube and the second branch refrigerant tube being connected to the first evaporator for the refrigerating compartment and the second evaporator for the freezing compartment, respectively;
a connecting refrigerant tube to connect an outlet of the first branch refrigerant tube to an inlet of the second branch refrigerant tube so as to connect the first evaporator to the second evaporator in series; and
a control unit to operate the compressor and the multi-directional valve, and to drive the first fan for the refrigerating compartment and the second fan for freezing compartment until temperatures of the refrigerating compartment and the freezing compartment reach a predetermined reference temperature,
wherein, when the detected external temperature meets a low temperature condition, the control unit controls the multi-directional valve to open the first branch refrigerant tube and close the second branch refrigerant tube, to supply the refrigerant to the first evaporator for the refrigerating compartment and the second evaporator for the freezing compartment such that the compressor is operated and an operation of the first fan for the refrigerating compartment is halted.

14. The refrigerator according to claim 13, further comprising a condenser provided between the compressor and the multi-directional valve;
a first capillary tube provided between the first evaporator for the refrigerating compartment and the multi-directional valve;
a second capillary tube provided between the second evaporator for the freezing compartment and the multi-directional valve; and
a subsidiary capillary tube provided on the connecting refrigerant tube.

15. A refrigerator comprising:
a main body comprising a refrigerating compartment and a freezing compartment;
a first evaporator and a second evaporator provided corresponding to the refrigerating compartment and the freezing compartment, respectively;
a compressor to compress refrigerant to be supplied to the first and second evaporators;

a first fan and a second fan to supply cool air to the refrigerating compartment and the freezing compartment, respectively;

an external temperature sensor to detect an external temperature of the refrigerator;

a refrigerant supplying tube to supply the refrigerant from the compressor to the first evaporator for the refrigerating compartment and the second evaporator for the freezing compartment;

a first branch refrigerant tube and a second branch refrigerant tube diverged from the refrigerant supplying tube, the first branch refrigerant tube and the second branch refrigerant tube being connected to the first evaporator for the refrigerating compartment and the second evaporator for the freezing compartment, respectively;

a connecting refrigerant tube to connect an outlet of the first branch refrigerant tube to an inlet of the second branch refrigerant tube so as to connect the first evaporator to the second evaporator in series; and a control unit to operate the compressor and the multi-directional valve, and to drive the first fan for the refrigerating compartment and the second fan for freezing compartment until temperatures of the refrigerating compartment and the freezing compartment reach a predetermined reference temperature, wherein when the detected external temperature meets a low temperature condition, such that the compressor is operated and an operation of the first fan for the refrigerating compartment is halted, the control unit controls the multi-directional valve to open the first branch refrigerant tube and close the second branch refrigerant tube, to supply the refrigerant to the first evaporator for the refrigerating compartment and the second evaporator for the freezing compartment for a predetermined time, and to close the first branch refrigerant tube and open the second branch refrigerant tube, to supply the refrigerant to the second evaporator for the freezing compartment after a lapse of the predetermined time.

16. The refrigerator according to claim 15, further comprising:

a condenser provided between the compressor and the multi-directional valve;

a first capillary tube provided between the first evaporator for the refrigerating compartment and the multi-directional valve;

a second capillary tube provided between the second evaporator for the freezing compartment and the multi-directional valve; and a subsidiary capillary tube provided on the connecting refrigerant tube.

17. A method for controlling a refrigerator including a main body having a refrigerating compartment and a freezing compartment, the method comprising:

operating a compressor to compress refrigerant;

controlling a multi-directional valve to supply the refrigerant compressed by the compressor to a first evaporator for the refrigerating compartment and a second evaporator for the freezing compartment, and operating a first fan for the refrigerating compartment and a second fan for the freezing compartment until a temperature of the refrigerating compartment and the freezing compartment reaches a predetermined reference temperature;

detecting an external temperature of the refrigerator; and supplying the refrigerant to the first evaporator for the refrigerating compartment such that the compressor is operated and an operation of the first fan for the refrigerating compartment is halted, when the detected external temperature meets a low temperature condition.

18. The method for controlling the refrigerator according to claim 17, wherein the method further comprises:

providing a first branch refrigerant tube and a second branch refrigerant tube to supply refrigerant to the first evaporator and the second evaporator, respectively;

connecting outlets of the first evaporator for the refrigerating compartment and the first branch refrigerant tube to an inlet of the second branch refrigerant tube so as to connect the first evaporator for the refrigerating compartment to the second evaporator for the freezing compartment in series; and controlling the multi-directional valve to open and close the first and second branch refrigerant tubes.

19. The method for controlling the refrigerator according to claim 18, further comprising:

controlling the multi-directional valve to open the first branch refrigerant tube and close the second branch refrigerant tube; and supplying the refrigerant to the first evaporator for the refrigerating compartment and the second evaporator for the freezing compartment when the external temperature meets the low temperature condition and while the compressor is operated.

20. The method for controlling the refrigerator according to claim 18, further comprising:

controlling the multi-directional valve to open the first branch refrigerant tube and to close the second branch refrigerant tube, to supply the refrigerant to the first evaporator for the refrigerating compartment and the second evaporator for the freezing compartment for a predetermined time, and to close the first branch refrigerant tube and open the second branch refrigerant tube, to supply the refrigerant to the second evaporator for the freezing compartment after a lapse of the predetermined time, when the external temperature meets the low temperature condition and while the compressor is operated.

21. A method of controlling a refrigerator having a refrigerating compartment and a freezing compartment, the method comprising:

controlling a multi-directional valve connected to first and second refrigerant tubes which supply refrigerant to a first and a second evaporator of the refrigerating compartment and the freezing compartment, respectively;

opening the first refrigerant tube while closing the second refrigerant tube to supply refrigerant to the first and second evaporators for a predetermined time period; and closing the first refrigerant tube and opening the second refrigerant tube to supply refrigerant to the second evaporator after a lapse of the predetermined time, when an external temperature of the refrigerator meets a preset low temperature condition and while a compressor of the refrigerator is operated.

* * * * *